(12) United States Patent
Schomann

(10) Patent No.: US 7,901,469 B2
(45) Date of Patent: Mar. 8, 2011

(54) ALTERNATIVE ORGANIC FUEL FORMULATIONS INCLUDING VEGETABLE OIL

(75) Inventor: Mark Schomann, Clinton Corners, NY (US)

(73) Assignee: Alternative Fuels Group Inc., Columbia, MD (US)

(*) Notice: Subject to any disclaimer, the term of this patent is extended or adjusted under 35 U.S.C. 154(b) by 368 days.

(21) Appl. No.: 11/797,774

(22) Filed: May 7, 2007

(65) Prior Publication Data

US 2008/0022584 A1  Jan. 31, 2008

Related U.S. Application Data

(60) Provisional application No. 60/833,272, filed on Jul. 26, 2006, provisional application No. 60/872,798, filed on Dec. 5, 2006.

(51) Int. Cl.
*C10L 1/182* (2006.01)
*C10L 1/06* (2006.01)

(52) U.S. Cl. .............. 44/308; 44/300; 44/307; 44/324; 44/451; 208/15

(58) Field of Classification Search .............. 44/329, 44/307, 415, 436, 308, 300, 401, 451, 449, 44/459, 437, 438, 439, 447, 452; 208/15
See application file for complete search history.

(56) References Cited

U.S. PATENT DOCUMENTS

| | | | |
|---|---|---|---|
| 11,239 A | 7/1854 | Drayton | |
| 266,859 A | 10/1882 | Meeds | |
| 1,498,340 A | 8/1918 | Belknap | |
| 1,775,461 A | 1/1925 | Hudson | |
| 2,194,495 A | 3/1940 | Christensen | |
| 4,359,324 A | 11/1982 | Elsea, Jr. et al. | |
| 4,397,655 A | 8/1983 | Sweeney | |
| 4,405,337 A | 9/1983 | Mori | |
| 4,451,267 A | 5/1984 | Schwab et al. | |
| 4,526,586 A | 7/1985 | Schwab et al. | |
| 4,557,734 A | 12/1985 | Schwab et al. | |
| 4,929,252 A | 5/1990 | Brillhart | |
| 5,380,343 A | 1/1995 | Hunter | |
| 5,520,708 A | 5/1996 | Johnson et al. | |
| 5,972,057 A | 10/1999 | Hayafuji et al. | |
| 6,013,114 A | 1/2000 | Hille et al. | |
| 6,015,440 A | 1/2000 | Noureddini | |
| 6,174,501 B1 | 1/2001 | Noureddini | |
| 6,364,917 B1 | 4/2002 | Matsumura et al. | |
| 6,923,838 B2 | 8/2005 | Maubert et al. | |
| 6,946,008 B2 | 9/2005 | Wenzel | |
| 6,965,044 B1 | 11/2005 | Hammond et al. | |
| 6,979,426 B2 | 12/2005 | Teall et al. | |
| 7,087,771 B2 | 8/2006 | Luxem et al. | |
| 7,112,229 B2 | 9/2006 | Khalil et al. | |
| 7,138,536 B2 | 11/2006 | Bournay et al. | |
| 2001/0037598 A1 | 11/2001 | Suppes et al. | |
| 2002/0026744 A1* | 3/2002 | Golubkov et al. .............. 44/436 |
| 2002/0178650 A1 | 12/2002 | Ikura et al. | |
| 2003/0004363 A1 | 1/2003 | Koncar et al. | |
| 2003/0083514 A1 | 5/2003 | Boocock | |
| 2003/0093943 A1 | 5/2003 | Jordan | |
| 2003/0097782 A1 | 5/2003 | Jordan | |
| 2003/0097783 A1* | 5/2003 | Jordan .............................. 44/307 |
| 2003/0126790 A1 | 7/2003 | McCoy | |
| 2003/0163952 A1 | 9/2003 | Rae | |
| 2003/0167681 A1 | 9/2003 | Delgado Puche | |
| 2003/0167682 A1 | 9/2003 | Crawford et al. | |
| 2003/0229237 A1 | 12/2003 | Haas et al. | |
| 2004/0139649 A1 | 7/2004 | Ingendoh et al. | |
| 2005/0060929 A1 | 3/2005 | Caprotti et al. | |
| 2005/0160662 A1* | 7/2005 | Jordan .............................. 44/329 |
| 2005/0166447 A1* | 8/2005 | Corkwell et al. .............. 44/415 |
| 2005/0257420 A1 | 11/2005 | Wenzel | |
| 2005/0268535 A1 | 12/2005 | Nelson, Jr. et al. | |
| 2005/0268539 A1 | 12/2005 | Schwab et al. | |
| 2006/0014974 A1 | 1/2006 | Bournay et al. | |
| 2006/0021277 A1 | 2/2006 | Petersen et al. | |
| 2006/0037237 A1 | 2/2006 | Copeland et al. | |
| 2006/0094890 A1 | 5/2006 | Sharma et al. | |
| 2006/0260184 A1 | 11/2006 | Landano | |

OTHER PUBLICATIONS

"Title of Laws State Wyoming"; HTTP://LEGISWEB.STATE.WY.US.HTM; Jun. 13, 2006.*
Tickell, J. et al. (Aug./Sep. 1999). "Fuel for the New Millenium," *Home Power*. #72; pp. 84-88.
International Search Report and Written Opinion, mailed on Jan. 31, 2008, directed to counterpart International Application No. PCT/US07/16716. 11 pages.
"Biofuel Technologies," located at <http://www.oregon.gov/ENERGY/RENEW/Biomass/biofuels.shtml> visited on Dec. 5, 2006. (3 pages).
Biswas et al. "Biodiesel: Technology & Business Opportunities—An Insight," located at <http://www.tifac.org.in/news/Bioenergy_1.htm> visited on Dec. 5, 2006. (14 pages).
"Oberlin College Sets up Alternative Fuel Station for Vehicles to Run on Vegetable Oil," *In Business* (May/Jun. 2006): 6.
"Oil yields and characteristics," located at <http://journeytoforever.org/biodiesel_yield.html> visited on Dec. 5, 2006. (10 pages).
Peterson, C. (Jun. 1995). "Commercialization of Idaho Biodiesel (HySEE) From Ethanol and Waste Vegetable Oil," 2 pages. Powers, Susan, (Sep. 2006). "'Fueling the Future' on Biomass Industries," *BioCycle* : 51-53.
International Search Report and Written Opinion, mailed on Dec. 18, 2007, directed to related International Application No. PCT/US07/16717; 10 pages.
Schomann, U.S. Office Action mailed Aug. 3, 2009, directed to related U.S. Appl. No. 11/878,438; 11 pages.
Schomann, U.S. Office Action mailed Feb. 18, 2010, directed to related U.S. Appl. No. 11/878,438; 11 pages.

* cited by examiner

*Primary Examiner* — Ellen M McAvoy
*Assistant Examiner* — Chantel Graham
(74) *Attorney, Agent, or Firm* — Morrison & Foerster LLP

(57) ABSTRACT

Fuel formulations may be produced from vegetable oil without the need to remove glycerin from the vegetable oil prior to use. The fuel formulations may be used in diesel fuel vehicles and/or as a home heating oil. The fuel formulations may include vegetable oil, kerosene, a fuel stabilizer, and a cetane boost additive.

32 Claims, No Drawings

ALTERNATIVE ORGANIC FUEL FORMULATIONS INCLUDING VEGETABLE OIL

CROSS REFERENCE TO RELATED APPLICATIONS

This application claims the benefit of U.S. Provisional Application Ser. No. 60/833,272, filed Jul. 26, 2006, and U.S. Provisional Application Ser. No. 60/872,798, filed Dec. 5, 2006.

FIELD OF THE INVENTION

This invention relates to alternative fuel formulations including vegetable oil. More particularly the invention relates to vegetable oil fuel formulations in which glycerin does not have to be removed from raw vegetable oil and/or formulations that do not include petroleum diesel.

BACKGROUND OF THE INVENTION

Biodiesel is an alternative fuel based on renewable resources, most commonly vegetable oil. Biodiesel itself contains no petroleum, but is typically blended with petroleum diesel to create a Biodiesel blend.

The term Biodiesel is generally used to describe the output of a thermodynamic process where the glycerin component of vegetable oil is separated and removed from the ethyl or methyl esters of the source oil. The glycerin component of vegetable oil is normally considered a negative because its presence raises the viscosity and flash point of vegetable oil to levels that are incompatible with commonly used diesel engines.

Biodiesel offers several benefits over typical fossil fuels. These benefits include cleaner burning and the fact that it can be produced from available renewable resources.

Biodiesel, however, also has many drawbacks. For example, the process of producing Biodiesel is capital intensive and time consuming. The Biodiesel process also has ecological negatives, primarily in the form of pollutant byproducts.

Further, Biodiesel may not be 100% compatible with petroleum diesel in the areas of flash point, viscosity, cetane rating, and cold weather performance, among others. Accordingly, Biodiesel is typically blended with petroleum diesel to allow it to be used in vehicles that have not been modified for the use of pure Biodiesel.

The typical Biodiesel process begins by taking, for example, ten gallons of used vegetable oil. The oil is first filtered to remove food particulates in the oil. Methanol and lye are then added to the oil. The mixture is heated for a period of time, often several hours, to a temperature generally between 48 and 54 degrees C. The solution is then allowed to cool, generally for 8 hours or longer, during which the heavier glycerin component precipitates out of the solution. The methyl esters—the Biodiesel—are then skimmed off of the top of the solution. Generally, a little over 60 vol. % of the solution will be refined Biodiesel fuel. The glycerin by-product is approximately 8 vol. % by volume of the original oil. Next, the Biodiesel fuel is cleaned with water to remove any remaining lye. If the lye is not completely removed from the fuel it can corrode certain types of vehicle fuel lines and, potentially, clog fuel filters. Finally, the Biodiesel is cleaned and dried in a process that separates water and residual impurities from the pure Biodiesel. Among the pollutant byproducts of this process is water tainted with lye.

SUMMARY OF THE INVENTION

Because of the numerous drawbacks associated with producing and utilizing Biodiesel, a need exists for vegetable oil-based fuel formulations that do not require the separation of glycerin from raw vegetable oil or the blending of the formulation with petroleum diesel. Accordingly, this invention includes what I call Alt-diesel fuel formulations and methods of making Alt-diesel fuel formulations that include vegetable oil in which glycerin may not be removed from the vegetable oil prior to use.

One embodiment of a fuel formulation includes 25 to 75 vol. % vegetable oil in which the glycerin has not been removed, 25 to 75 vol. % kerosene, 0.001 to 5 vol. % fuel stabilizer, and 0.01 to 5 vol. % cetane boost additive.

The cetane boost additive may include octylnitrate. The vegetable oil may be an edible or non-edible plant oil. The vegetable oil may, for example, include (but is not limited to) jatropha oil, algae oil, soy oil, peanut oil. The formulation may further include 1 to 20 vol. % turpentine. The fuel formulation may be configured to be used as an automotive fuel.

Another embodiment of a fuel formulation includes 25 to 75 vol. % vegetable oil from which the glycerin has not been removed, 1 to 50 vol. % kerosene, 1 to 50 vol. % turpentine, 0.001 to 5 vol. % fuel stabilizer, and 0.01 to 5 vol. % cetane boost additive.

Yet another embodiment of a fuel formulation includes 70 to 98 vol. % vegetable oil, 1 to 20 vol. % kerosene, and 1 to 20 vol. % regular gasoline. The glycerin is not required to be removed from the vegetable oil. The formulation may include 0.01 to 5 vol. % cetane booster, and/or 0.001 to 5 vol. % fuel stabilizer. The formulation may also include 1 to 20 vol. % turpentine.

Another embodiment of a fuel formulation includes 70 to 98 vol. % vegetable oil, 1 to 40 vol. % ethanol, 1 to 20 vol. % kerosene, and 0.01 to 40 vol. % surfactant. The glycerin is not required to be removed from the vegetable oil. The formulation may include 0.01 to 5 vol. % cetane booster, and/or 0.001 to 5 vol. % fuel stabilizer. The formulation may also include 1 to 20 vol. % turpentine.

A method of producing a fuel formulation includes blending together 70 to 98 vol. % vegetable oil from which the glycerin has not been removed, 1 to 20 vol. % kerosene, and 1 to 20 vol. % regular gasoline.

Another method of producing a fuel formulation includes blending together 70 to 98 vol. % vegetable oil from which the glycerin has not been removed, 1 to 40 vol. % ethanol, 1 to 20 vol. % kerosene, and 0.01 to 40 vol. % surfactant.

Yet another method of producing a fuel formulation includes blending together 25 to 75 vol. % vegetable oil in which the glycerin has not been removed, 1 to 50 vol. % kerosene, 1 to 50 vol. % turpentine, 0.001 to 5 vol. % fuel stabilizer, and 0.01 to 5 vol. % cetane boost additive.

Another method of producing a fuel formulation includes blending together 25 to 75 vol. % vegetable oil from which the glycerin has not been removed, 25 to 75 vol. % kerosene, 0.001 to 5 vol. % fuel stabilizer; and 0.01 to 5 vol. % cetane boost additive.

DETAILED DESCRIPTION OF THE INVENTION

Alternative formulations of vegetable oil-based fuels (hereinafter referred to as Alt-diesel formulations) that overcome or lessen several of the drawbacks of Biodiesel may be produced. These formulations can be produced quickly and easily and can have little or no cold weather sensitivity at temperature lows typical to North America.

These Alt-diesel formulations can burn more cleanly than fossil fuels such as #2 diesel. Alt-diesel formulations can burn at least 50% more cleanly than fossil fuels and, even at least 80% or more cleanly.

Alt-diesel formulations are noncorrosive so there are no fuel line problems or clogging of fuel filters. Vehicles may run on the Alt-diesel formulations without the need to modify the vehicles or vehicle components.

These Alt-diesel formulations are stable and can be stored for long terms before use without breaking down. Some Alt-diesel formulations may be stored at least one month, or a year or more before use.

In one embodiment, the production of an Alt-diesel formulation starts with vegetable oil, for example, ten gallons of used or fresh soy oil. A wide variety of oils is suitable. Virtually any non-animal plant oil can be used. As used herein the term "vegetable oil" will be used to refer to all non-animal plant oils suitable for use as fuel. Preferred oils include jatropha, algae, soy, peanut and a variety of other edible and non-edible vegetable oils. It is particularly beneficial that the described process utilize oils from non-edible plant sources.

Preferably, the oil does not include or only includes small amounts of shortening. Although vegetable shortening will work, less fuel is produced and more byproducts per gallon are generated from shortening. In addition, because of the higher water content in shortening, shortening is a poor fuel for use in diesel engines.

Either fresh or used oil can be used. Used oil, however, is preferably separated before use. Used oil, for example, can be gathered from either restaurants or a manufacturing facility. It can then be strained and placed in a settling tank. The oil then preferably settles for at least twelve hours. This process separates the good oil from the water and fats. The water and fats will settle to the bottom of the tank and can be drained off. The good oil or fresh oil can then be filtered either before or after mixing with one or more fossil fuels and/or additives.

Preferred amounts of vegetable oil in some formulations may include 25 to 75 vol. %, 30 to 70 vol. %, and 40 to 60 vol. %. Preferred amounts of vegetable oil in other formulations may include 70 to 98 vol. %, 75 to 95 vol. %, and 80 to 90 vol. %.

The Alt-diesel formulation may include kerosene, which can be added to reduce the viscosity of the oil. Preferred amounts of kerosene in some formulations may include 25 to 75 vol. %, 30 to 70 vol. %, and 40 to 60 vol. %. Preferred amounts of kerosene in other formulations may include 1 to 20 vol. %, 5 to 15 vol. %, and 7 to 12 vol. %. Preferred amounts of kerosene in yet other formulations may include 1 to 50 vol. %, 10 to 40 vol. % and 15 to 35 vol. %.

The Alt diesel formulation may include turpentine, which like kerosene can be added to reduce the viscosity of the oil. Turpentine has the added benefit that it can be obtained from organic sources. Preferred amounts of turpentine in some formulations may include 25 to 75 vol. %, 30 to 70 vol. %, and 40 to 60 vol. %. Preferred amounts of turpentine in other formulations may include 1 to 20 vol. %, 5 to 15 vol. %, and 7 to 12 vol. %. Preferred amounts of turpentine in yet other formulations may include 1 to 50 vol. %, 10 to 40 vol. % and 15 to 35 vol. %.

The Alt-diesel formulation may include a fuel stabilizer. Fuel stabilizers are additives which help prevent the fuel from undergoing degradation and oxidation, particularly during prolonged storage. Fuel stabilizers can also be used to prevent glycerin in the fuel from clogging the intake system. An example of a preferred fuel stabilizer is DIESEL KLEAN manufactured by Share Corp. Another example of a preferred fuel stabilizer is STA-BIL fuel stabilizer manufactured by Gold Eagle Co. Preferred amounts of fuel stabilizer in the formulation include 0.001 to 5 vol. %, 0.01 to 1 vol. %, and 0.05 to 0.10 vol. %.

The Alt-diesel formulation may include regular gasoline to aid with ignition. Preferred amounts of regular gasoline in the formulation include 1 to 20 vol. %, 2 to 10 vol. %, and 3 to 7 vol. %.

The Alt-diesel formulation may include a cetane booster. A preferred cetane booster includes octylnitrate alone or in combination with other cetane boosting agents. An Example of a preferred cetane booster is AMSOIL cetane boost additive. Preferred amounts of cetane booster in the formulation include, 0.01 to 5 vol. %, 0.05 to 3 vol. %, and 0.1 to 2 vol. %.

One method of producing an Alt-diesel formulation may include blending vegetable oil, kerosene, fuel stabilizer, regular gasoline and cetane booster. The mixture is then ready for use.

Another method of producing an Alt-Diesel formulation may include blending vegetable oil, kerosene, a fuel stabilizer, and a cetane booster. Yet another method of producing an Alt-Diesel formulation may include blending vegetable oil, kerosene, turpentine, a fuel stabilizer, and a cetane booster.

The Alt-diesel formulation may include ethanol. Ethanol can neutralize the negative attributes of glycerin in vegetable oil, as the glycerin is rendered inert and burned off in the combustion process. In addition, when ethanol is used in the formulation the amount of gasoline and kerosene used in the formulation can be reduced or even eliminated. The ethanol may be pure ethanol or denatured ethanol. Preferred amounts of ethanol in the formulation include 1 to 40 vol. %, 5 to 25 vol. %, and 10 to 20 vol. %.

Another benefit that the ethanol brings to the ethanol containing Alt-diesel formulation is a reduction or elimination in the need for the fuel stabilizer component used in the previous formulation (as the surfactant/fuel-line-antifreeze achieves a similar result). Preferred amounts of fuel stabilizer in an ethanol containing formulation include 0.001 to 1 vol. %, 0.005 to 0.75 vol. %, and 0.002 to 0.003 vol. %.

The Alt-diesel formulation may include a surfactant. The surfactant component can be used to help insure the proper blending properties of the oil and ethanol. This component can also be used in the regulation of viscosity. Many suitable surfactants are currently used in fuel line antifreeze products sold today. Preferred surfactants include, but are not limited to, Toluene, Acetone, and Stoddard solvent. Preferred amounts of surfactant in the formulation include 0.01 to 40 vol. %, 0.1 to 10 vol. %, and 0.5 to 5 vol. %.

An example of a method of producing an ethanol containing formulation includes blending vegetable oil, ethanol, a surfactant, and optionally, other ingredients to achieve the operational and burn characteristics of distillate petroleum fuels such as diesel and home heating oil.

The process can be accomplished using simple mixing and filtration equipment. The process preferably produces no harmful by-products. Specifically, the process preferably produces only food particulates, and then only when waste oil is used in the formulation, which can be sold to, for example, dog food manufacturers. The fuel also preferably leaves little or no build up in the intake and the exhaust manifolds of the engine. The Alt-diesel formulations can provide better lubrication than fossil diesel. In addition to working in diesel engine automobiles, the fuel can also be used as a home heating oil with no need for modification of the burner needed.

The oil or Alt-diesel formulations are preferably filtered to run through a typical diesel vehicle fuel filter of 2 micron filtration. Preferably, the Alt-diesel formulations are filtered to remove particulates that are more than 1 micron in diameter.

The Alt-diesel formulations can be produced by filtering the oil or formulations using one or more filters. A filtration system for used oil can include screening the oil as it is poured into a settling tank. The oil is then pumped from the settling tank through a 10 to 30 micron, more preferably 15 to 20 micron filter and then through a 1 micron carbon filter. Finally, the oil is pumped through a 5 to 50 micron, more preferably, a 10 to 30 micron desiccate filter to remove any remaining water. The water separator is used because water can be extremely detrimental to diesel engines. The filtered oil can be mixed, if it wasn't mixed prior to filtering, with the fossil fuel(s) and/or additives and is ready to be pumped into the vehicle.

By filtering the fuel formulations using a series of filters, the pressure required to move the thick oil through the filters can be reduced. If new oil is being used the oil may only be pumped through a ten micron desiccate filter and then mixed.

EXAMPLES

This invention will be better understood with reference to the following non-limiting examples, which are intended to illustrate specific embodiments within the overall scope of the invention.

Example 1

10 gallons of filtered oil were mixed with one gallon of kerosene and 5 oz of STA-BIL fuel stabilizer. The 10% kerosene is the normal amount added to regular diesel fuel to run in cold weather. The 10% kerosene also appeared to give the oil the same viscosity as regular diesel. The STA-BIL fuel stabilizer was added to attach to the micro droplets of water in the oil. 1 oz of fuel stabilizer was added to 2.5 gallons of fuel.

The fuel was used in a diesel John Deere tractor. The tractor would not start at first, but did eventually start when ether was used to facilitate initial combustion. The engine ran very roughly until it warmed up to normal operating temperature. Once up to temperature the engine ran well. This test showed that an additional component should be added to the formulation to produce a flash point typically used to get combustion initiated while starting the engine. Accordingly, 5% regular gasoline was added to the mix to provide the needed flash point at ignition. With this refined formulation, the engine started and ran with no ether.

Example 2

DIESEL KLEAN with Cetane booster was added to the formulation described in Example 1 including the regular gasoline to help prevent residue build up and to raise the cetane level of the fuel. This mixture was then run in a used 1997 Volkswagen Passat TDI. Prior to running the mixture in the Passat, the intake was taken off of the engine. The intake was completely clogged with soot. In addition, the EGR valve was clogged as was the water pre-heater (this is a common problem with diesel engines run in the Northeast part of the United States). Accordingly, these parts were cleaned as well as possible prior to running the fuel.

10,000 miles of testing was conducted on the Passat using this Alt-diesel formulation. During testing, the Passat was left exposed to low over-night temperatures (recorded morning temperatures were as low as −4° F.). The Passat started without the block heater plugged in and without ether. The Passat would likely not have started on regular diesel under these conditions.

After 10,000 miles the intake manifold of the Passat was removed to measure the soot build up. Not only was there no build up, but the remains of the soot that were not removed earlier were starting to wash clean. The Alt-diesel formulation was not only running cleanly but was also clearing the engine of old residue.

This Alt-diesel fuel was next tested on an unmodified 1986 Volvo Diesel, an unmodified 1980 Mercedes 300SD, an unmodified a 2005 Jeep Liberty Diesel and a Mercedes E300 diesel, to validate that the formulation worked on a variety of vehicles without modifications. The Alt-diesel fuel ran successfully on all of these vehicles without any modifications.

The 2005 Jeep Liberty Diesel has one of the most sophisticated diesel management systems of any diesel vehicle running in North America and, accordingly, provides a good test case for the use of the Alt-diesel formulation in demanding applications. The Jeep was bought in North Carolina and then driven to New York. The dealer noted that the Jeep might not run as well on the dirty diesel fuel sold in the north east. The Jeep was driven to New York on the southern-specification diesel fuel and subsequently run on the Alt-diesel formulation. The Jeep ran more quietly on the Alt-diesel formulation. New York-specification diesel was then put in the Jeep and, after being started, the check engine light came on. The conclusion is that the Jeep rejected the New York-specification diesel fuel but ran with no issues on the Alt-diesel formulation.

Finally, the Alt-diesel formulation was used as a home heating oil. An old oil fired hot air furnace was used for the test. The same filtration process described above for the cars was used, but the Alt-diesel formulation was modified. Since the oil burner had an ignition system, the gasoline was removed from the mixture. The fuel burned perfectly with no change in nozzle size.

Accordingly, an embodiment of the Alt-diesel formulation for cars is:

10 gallons used vegetable or peanut oil 1 gallon of Kerosene

½ gallon of regular gasoline 1.5 oz of STA-BIL fuel stabilizer 7 oz of Diesel Klean with cetane boost or Diesel fuel supplement with cetane boost The same formulation with or without the regular gasoline can be used as a home heating oil. The fuel formulation was then tested for compliance with ASTM standards for #2 Diesel and Biodiesel. The results of these tests appear in Table 1.

Example 3

An ethanol containing Alt-diesel formulation was prepared by mixing 10 gallons of used Vegetable Oil, 1 Gallon denatured ethanol, ½ gallon of Kerosene, 7 oz of Diesel Klean with cetane boost, and 1.5 oz Toluene. This formulation can be used as an automotive fuel.

Example 4

An Alt diesel formulation was prepared by mixing 500 ml vegetable oil, 500 ml kerosene, 5 ml Diesel Kleen and 3 ml cetane boost additive. The fuel formulation was then tested for compliance with ASTM standards for #2 Diesel and Biodiesel. The results of these tests appear in Table 1. Preferably, the Alt-diesel formulation is selection to meet exceed one or more of these standards. As shown in Table 1, this formulation met or exceeds the requirements for #2 Diesel and Biodiesel.

Example 5

An Alt diesel formulation was prepared by mixing 500 ml vegetable oil, 250 ml kerosene, 250 turpentine, 5 ml Diesel Kleen and 10 ml cetane boost additive. The fuel formulation was then tested for compliance with ASTM standards for #2 Diesel and Biodiesel. The results of these tests appear in Table 2.

TABLE 1

| Property | ASTM Test Method | ASTM D975 Standard for #2 Diesel (Low Sulfer) | Additional Standards for #2 Diesel | Additional Standards for Biodiesel (B100) | Example 4 Formulation | Test Method Employed (Intertek) | Example 2 Formulation | Test Method Employed (Intertek) |
|---|---|---|---|---|---|---|---|---|
| Flash Point - degrees Celsius minimum | D93 | 52 C./125.6 F. | | | 135 F. *** | D93A | 100 * | D93A |
| Water - % volume (D2709) or parts per million maximum (D1744) | D2709 or D1744 | 0.05 (D2709) | | | <0.005 *** | D2709 | <0.05 *** | D2709 |
| Sediment - % volume (D2709) or parts per million maximum (D5452) | D2709 or D5452 | 0.05 (D2709) | | | <0.005 *** | D2709 | <0.05 *** | D2709 |
| Distillation % volume recovery - 90% maximum, degrees Celsius | D86 | 282 to 338 | | 360 | 366.4 ** | D1160 (6) Alt. | >800 * | D1160 Alt. |
| Kinematic Viscosity - 40 degrees Celsius | D445 | 1.9 to 4.1 | | 1.9 to 6.0 | 6.202 ** | D445 | 14.96 * | |
| Copper Corrosion - test strip maximum | D130 | Number 3 | | | 1a *** | D130 | 1a *** | D130 |
| Acid Number - mg KOH/g | | | | 0.5 | 0.087 *** | D664 | | |
| Cetane Number - minimum | D613 | 40 | | 47 | 42.9 *** | D613 | 40.3 ** | D613 |
| Ramsbottom Carbon - 10% residue maximum | D524 | 0.15 | 0.35 | 0.05 | 0.24 ** | D4530 Alt. | 0.16 *** | D524 |
| API Gravity - maximum | D287 or D4052 | | 39 | | 31.5 *** | D4052 | | |
| Lubricity - load grams minimum (D6078) or microns maximum (D6079) | D6078 or D6079 (3) | 520 (D6079) | | | 217 *** | D6079 | 182.5 *** | D6079 |
| Accelerated Stability | D2274 | | 15 | | | | | |
| Low Temperature Flow - degrees Celsius | D2500 or D4539 | | (4) | | −16 C./ 3.2 F. *** | D2500 | −10.8 C./ 12.6 F. ** | D2500 |
| Ash - % maximum | D482 or D874 | 0.01 | | 0.02 | <0.001 *** | D874 | <0.001 *** | D482 |
| Sulfer - parts per million | D5453 (2) | 15 ppm or 0.05% | | 0.05 | 5.3 ppm *** | D5453 | 0.004% *** | D5453 |
| Phosphorous Content | | | | 0.001 | <0.0010 *** | D4951 | | |
| Calcium | | | | Ca + Mg < 5.0 | <1.0 *** | EN14538 | | |
| Magnesium | | | | Ca + Mg < 5.0 | <1.0 *** | EN14538 | | |
| Sodium | | | | Na + K < 5.0 | 1.1 *** | EN14538 | | |
| Potassium | | | | Na + K < 5.0 | <1.0 *** | EN14538 | | |
| Oxidation Stability Induction Period @110 C. | | | | >3.0 HR | 7.6 HR *** | EN14112 | | |
| Microbial Growth | | | (5) | | | | | |

EASILY MEETS OR EXCEEDS SPECIFICATION: ***

MARGINALLY MEETS/MISSES SPECIFICATION: **

MISSES SPECIFICATION: *

ALTERNATE TEST METHOD EMPLOYED: Alt.

(1) #1 DF and #2 DF are intended for use in the same applications described in the definitions of Grade No. 1-D and Grade No. 2-D respectively in ASTM D975.

(2) ASTM test D2622 is the test recommended by the EMA while test D5453 is used by the California Air Research Board (CARB).

(3) EMA recommends that lubricity levels be determined by ASTM D6078, Scuffing Load Wear Test (SBOCLE). Alternatively, lubricity may be measured using the High Frequency Reciprocating Rig (HFRR). ASTM D6079. Using this test a wear scar of 0.45 mm at 60° C. is equivalent to a SBOCLE result of 3100 g.

(4) Diesel fuels must pass the Cloud Point (D2500) Or Low Temperature Flow Test (D4539) at the use temperature. Low temperature flow capability is the responsibility of the fuel supplier for retail fuels. It is adjusted monthly during the winter, depending on local climate. Unless specifically recommended by the engine manufacturer or discussed with the fuel supplier in advance, modification of the waxing properties of fuels using aftermarket fuel additives is not recommended as an option for meeting the low temperature operability requirement.

(5) While EMA has not included any recommendation with respect to Microbial Growth, it should be noted that microbial growth can cause operational problems, corrosion and sediment build-up in diesel engine fuel systems. The growth of microbes in fuel storage tanks and vehicle/equipment fuel tanks is believed to be related to pipeline and storage techniques and times and cannot be sufficiently addressed in a fuel specification.

(6) Distilliation procedures are not designed for biodiesel and hybrid biodiesel testing

TABLE 2

Test Results for Example 5 Formulation

| Method | Test | Results | Units |
|---|---|---|---|
| D4052 | API Gravity @ 60 Deg F. | 29.4 | deg API |
| D93 method A | Corrected Flash Point | 115 | deg F. |
| D2709 | Water and Sediment | <0.005 | Vol % |
| D445 at 40 deg C. | Kinematic Viscosity @ 40° C. | 6.078 | cSt |
| D874 | Sulfated Ash | <0.001 | Wt % |
| D5453 | Sulfur | 13.1 | ppm |
| D130 | Copper Corrosion @ 122° F. for 3 hrs | 1a | |
| D613 | Cetane Number | 45.2 | |
| D2500 | Cloud Point | .17 | deg C. |
| D2500 | Cloud Point | 1.4 | deg F. |
| D4530 | Micro Carbon Residue | 0.35 | Wt % |
| D664 | Acid Number | 0.082 | mg KOH/g |
| D4951 | Phosphorus | <0.0010 | Wt % |
| D1160, deg F. | Initial Boiling Point | 273.8 | deg F. |
| D1160, deg F. | 5% Recovery | 334.7 | deg F. |
| D1160, deg F. | 10% Recovery | 338.7 | deg F. |
| D1160, deg F. | 20% Recovery | 356.7 | deg F. |
| D1160, deg F. | 30% Recovery | 390.6 | deg F. |
| D1160, deg F. | 40% Recovery | 424.6 | deg F. |
| D1160, deg F. | 50% Recovery | 834.6 | deg F. |
| D1160, deg F. | Final Boiling Point | 922.1 | deg F. |
| D1160, deg F. | % Recovered | 60.0 | % |
| D1160, deg F. | % Loss | 0.0 | % |
| D1160, deg F. | % Residue | 40.0 | % |
| EN 14538 | Calcium | <1.0 | mg/kg |
| EN 14538 | Magnesium | <1.0 | mg/kg |
| EN 14538 | Sodium | <1.0 | mg/kg |
| EN 14538 | Potassium | <1.0 | mg/kg |
| EN 14112 | Oxidation Stability Induction Period @ 110° C. | 4.8 | hr |

This application discloses several numerical ranges. The numerical ranges disclosed are intended to support any range or value within the disclosed numerical ranges even though a precise range limitation is not stated verbatim in the specification because this invention can be practiced throughout the disclosed numerical ranges. It is also to be understood that all numerical values and ranges set forth in this application are necessarily approximate. It also to be understood that within these ranges, the Alt-diesel formulation can be tailored to meet the ASTM specifications of a wide range of petroleum fuels in the diesel family including, but not limited to, numbers 1 through 5 specification diesel, home heating oil, and aviation jet fuel.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

The invention claimed is:

1. A fuel formulation comprising:
   25 to 75 vol. % vegetable oil from which the glycerin has not been removed;
   25 to 75 vol. % kerosene;
   0.001 to 5 vol. % fuel stabilizer; and
   cetane boost additive, wherein the fuel formulation meets or exceeds the ASTM D975 requirements for low sulfur #2 diesel.

2. The formulation of claim 1, wherein the cetane boost additive comprises octylnitrate.

3. The formulation of claim 1, wherein the vegetable oil is a non-edible plant oil.

4. The formulation of claim 1, wherein the vegetable oil comprises jatropha oil, algae oil, soy oil, or peanut oil.

5. The formulation of claim 1, further comprising 1 to 20 vol. % turpentine.

6. The fuel formulation of claim 1, wherein the fuel formulation is configured to be used as an automotive fuel.

7. A fuel formulation comprising:
   25 to 75 vol. % vegetable oil from which the glycerin has not been removed;
   1 to 50 vol. % kerosene;
   1 to 50 vol. % turpentine;
   0.001 to 5 vol. % fuel stabilizer; and
   cetane boost additive, wherein the fuel formulation meets or exceeds the ASTM D975 requirements for low sulfur #2 diesel.

8. The formulation of claim 7, wherein the cetane boost additive comprises octylnitrate.

9. The formulation of claim 7, wherein the vegetable oil is a non-edible plant oil.

10. The formulation of claim 7, wherein the vegetable oil comprises jatropha oil, algae oil, soy oil, or peanut oil.

11. The fuel formulation of claim 7, wherein the fuel formulation is configured to be used as an automotive fuel.

12. A fuel formulation comprising:
   70 to 98 vol. % vegetable oil from which the glycerin has not been removed;
   1 to 20 vol. % kerosene; and
   1 to 20 vol. % regular gasoline, wherein the fuel formulation meets or exceeds the ASTM D975 requirements for low sulfur #2 diesel.

13. The formulation of claim 12, further comprising 0.01 to 5 vol. % cetane boost additive.

14. The formulation of claim 13, wherein the cetane boost additive comprises octylnitrate.

15. The formulation of claim 12, further comprising 0.001 to 5 vol. % fuel stabilizer.

16. The formulation of claim 12, wherein the vegetable oil is a non-edible plant oil.

17. The formulation of claim 12, wherein the vegetable oil comprises jatropha oil, algae oil, soy oil, or peanut oil.

18. The formulation of claim 12, further comprising 1 to 20 vol. % turpentine.

19. The fuel formulation of claim 12, wherein the fuel formulation is configured to be used as an automotive fuel.

20. A fuel formulation comprising:
70 to 98 vol. % vegetable oil from which the glycerin has not been removed;
1 to 40 vol. % ethanol;
1 to 20 vol. % kerosene; and
0.01 to 40 vol. % surfactant, wherein the fuel formulation meets or exceeds the ASTM D975 requirements for low sulfur #2 diesel.

21. The formulation of claim 20, further comprising 0.01 to 5 vol. % cetane boost additive.

22. The formulation of claim 21, wherein the cetane boost additive comprises octylnitrate.

23. The formulation of claim 20, further comprising 0.001 to 5 vol. % fuel stabilizer.

24. The formulation of claim 20, wherein the surfactant comprises toluene.

25. The formulation of claim 20, wherein the vegetable oil is a non-edible plant oil.

26. The formulation of claim 20, wherein the vegetable oil comprises jatropha oil, algae oil, soy oil, or peanut oil.

27. The formulation of claim 20, further comprising 1 to 20 vol. % turpentine.

28. The fuel formulation of claim 20, wherein the fuel formulation is configured to be used as an automotive fuel.

29. A method of producing a fuel formulation comprising:
blending together 70 to 98 vol. % vegetable oil in which the glycerin has not been removed, 1 to 20 vol. % kerosene, and 1 to 20 vol. % regular gasoline, wherein the fuel formulation meets or exceeds the ASTM D975 requirements for low sulfur #2 diesel.

30. A method of producing a fuel formulation comprising:
blending together 70 to 98 vol. % vegetable oil in which the glycerin has not been removed, 1 to 40 vol. % ethanol, 1 to 20 vol. % kerosene, and 0.01 to 40 vol. % surfactant, wherein the fuel formulation meets or exceeds the ASTM D975 requirements for low sulfur #2 diesel.

31. A method of producing a fuel formulation comprising:
blending together 25 to 75 vol. % vegetable oil in which the glycerin has not been removed, 1 to 50 vol. % kerosene, 1 to 50 vol. % turpentine, 0.001 to 5 vol. % fuel stabilizer, and 0.01 to 5 vol. % cetane boost additive, wherein the fuel formulation meets or exceeds the ASTM D975 requirements for low sulfur #2 diesel.

32. A method of producing a fuel formulation comprising:
blending together 25 to 75 vol. % vegetable oil in which the glycerin has not been removed, 25 to 75 vol. % kerosene, 0.001 to 5 vol. % fuel stabilizer; and 0.01 to 5 vol. % cetane boost additive, wherein the fuel formulation meets or exceeds the ASTM D975 requirements for low sulfur #2 diesel.

* * * * *